(12) United States Patent
Tansy

(10) Patent No.: US 7,229,601 B2
(45) Date of Patent: Jun. 12, 2007

(54) AMMONIA RECLAMATION SYSTEM

(75) Inventor: Brian L. Tansy, Battle Ground, WA (US)

(73) Assignee: SEH-America, Inc., Vancouver, WA (US)

( * ) Notice: Subject to any disclaimer, the term of this patent is extended or adjusted under 35 U.S.C. 154(b) by 476 days.

(21) Appl. No.: 10/772,291

(22) Filed: Feb. 6, 2004

(65) Prior Publication Data

US 2005/0175523 A1 Aug. 11, 2005

(51) Int. Cl.
*C01C 1/02* (2006.01)
(52) U.S. Cl. ........................ 423/356; 423/357
(58) Field of Classification Search ................ 423/356, 423/357
See application file for complete search history.

(56) References Cited

U.S. PATENT DOCUMENTS

| | | | | |
|---|---|---|---|---|
| 4,111,759 A | * | 9/1978 | Didycz et al. | ................. 203/7 |
| 4,294,812 A | * | 10/1981 | Oler | .......................... 423/357 |
| 4,394,363 A | * | 7/1983 | Haese et al. | ................. 423/356 |
| 4,594,131 A | * | 6/1986 | Maier | .......................... 203/26 |
| 4,713,231 A | * | 12/1987 | Campbell et al. | ........... 423/356 |
| 4,828,660 A | | 5/1989 | Clark et al. | |
| 5,242,468 A | | 9/1993 | Clark et al. | |
| 5,496,778 A | | 3/1996 | Hoffman et al. | |
| 5,846,386 A | | 12/1998 | Hoffman et al. | |
| 6,558,643 B2 | * | 5/2003 | Blonigen et al. | ........... 423/356 |

* cited by examiner

*Primary Examiner*—Wayne A. Langel
(74) *Attorney, Agent, or Firm*—Oliff & Berridge, PLC

(57) ABSTRACT

A process for reclaiming ammonia from waste streams comprises reacting at least one waste stream with an excess of hydroxide to produce ammonia and water. The ammonia is removed from the reaction vessel and purified.

17 Claims, 1 Drawing Sheet

AMMONIA RECLAMATION SYSTEM

BACKGROUND OF THE INVENTION

1. Field of Invention

This invention is directed to the recovery of ammonia from waste streams. More specifically, this invention is directed to systems and methods for processing used chemical bath solutions to reclaim ammonia.

2. Description of Related Art

Semiconductor wafers, such as silicon wafers, are used for fabricating integrated circuits and solar cells, among other uses. Semiconductor wafer production is a multi-part process. First, in general, a semiconductor ingot is grown, often by the Czochralski method of pulling crystal, and shaped. The ingot is then sliced into wafers and prepared, through multiple steps, for polishing, in a process often referred to as the chemical wafer process. The wafer is then polished and inspected in the polished wafer process. Depending on end-use, the polished wafers are optionally subjected to a process by which an epitaxial layer is deposited on the wafer in the epitaxy process.

The use of highly purified ammonia in semiconductor wafer processing is well known. For example, U.S. Pat. No. 5,846,386 to Hoffman et al., U.S. Pat. No. 5,496,778 to Hoffman et al. and U.S. Pat. No. 5,242,468 to Clark et al. disclose the use of highly pure ammonia and liquid cleaners in the manufacture of semiconductor wafers and other electronic components.

During silicon wafer manufacturing, wafers are typically cleaned using solutions containing ammonia. Two common such solutions are SC-1 and SC-2 (Standard Clean) chemical bath solutions. SC-1 chemical bath solutions are highly basic and contain an oxidizing agent, usually hydrogen peroxide, $H_2O_2$, which must be treated prior to disposal. Specifically, SC-1 chemical baths contain high purity ammonium hydroxide ($NH_4OH$), hydrogen peroxide ($H_2O_2$) and water ($H_2O$). After several cleaning cycles, SC-1 chemical bath solutions will also include silicon, in the form of $H_2SiO_3$. However, SC-1 cleaning has its disadvantages. SC-1 solution is costly. In addition, including SC-1 cleaning in the process of manufacturing semiconductor chips requires the addition of steps for chemical and waste water treatment. Thus, SC-1 cleaning increases the complexity and the cost of semiconductor chip manufacture.

In conventional silicon wafer manufacturing processes, chemical bath solutions are treated before being discarded. Using SC-1 as an example, SC-1 chemical bath solutions are mixed with SC-2 chemical bath solutions, which are dilute solutions of hydrochloric acid (HCl) and hydrogen peroxide ($H_2O_2$). The combined solution is then neutralized with sulfuric acid ($H_2SO_4$) to produce ammonium sulfate (($NH_4)_2SO_4$) and water. Ammonium sulfate and water may be discharged safely into sewer systems, but environmental concerns remain and further processing may be necessary to avoid adverse environmental impacts in the future.

In addition, SC-1 chemical bath solutions are the source of significant expense in silicon wafer manufacturing processes. Very high-purity ammonium hydroxide for the SC-1 chemical baths and the sulfuric acid, used to neutralize the SC-1/SC-2 chemical bath combined solution, are expensive. Sewer fees are also costly.

Some reprocessing methods exist in the art for purifying certain liquids on an industrial scale. For example, U.S. Pat. No. 4,828,660 discloses a method for the reprocessing of ultrapure liquids, specifically sulfuric and peroxydisulfuric acids. The repurification disclosed is performed by withdrawing acid/oxidant solution from the processing stream, subjecting the acid/oxidant solution to, purification processes and reintroducing the purified solution into the process stream. However, there is no reprocessing or repurification method available, for recovering ammonia from ammonium-rich waste streams.

Thus, there is a need for semiconductor wafer processing systems and processes that eliminate the expense and waste problems associated with SC-1 cleaning.

SUMMARY OF THE INVENTION

This invention provides processes for reclaiming ammonia from waste streams that satisfy the above needs. More particularly, it provides embodiments of the processes for reclaiming ammonia from waste streams. The processes can effectively and inexpensively recover more than 50% of the ammonia in a waste stream and, if necessary, neutralize hydrogen peroxide present in the waste stream. In addition, embodiments of the processes can reduce the expense of using ammonia-containing cleaning solutions, such as SC-1 chemical bath solutions in a manufacturing process by reducing the need for acid neutralization of SC-1 chemical bath solutions and reducing the sewer and disposal charges associated with such manufacturing.

One common ammonia-containing waste stream is the SC-1 chemical bath solution used in semiconductor wafer manufacturing, including semiconductor wafer cleaning. In semiconductor wafer manufacturing, SC-1 chemical bath solutions commonly contain high-purity ammonium hydroxide ($NH_4OH$), hydrogen peroxide ($H_2O_2$) and water ($H_2O$), and after several cleaning cycles, dissolved and/or particulate silicon, in the form of $H_2SiO_3$. High-purity ammonium hydroxide and the sulfuric acid used to neutralize the SC-1 chemical bath solutions are costly, as are the fees associated with the disposal of ammonia-containing waste streams.

Similarly, other waste streams containing ammonia in various applications may require the recovery of ammonia from the waste stream. Ammonia is commonly used in various forms as a cleaning agent in various industries, including but not limited to semiconductor and MEMS manufacturing, biotechnology, agriculture, optics & optoelectronics.

Thus, an improved process of treating waste streams containing ammonia is desirable to lower costs and to decrease the amount of environmental impact of the ammonia-rich waste streams.

This invention provides methods for reclaiming ammonia from waste streams.

These and other features and advantages of this invention are described in, or are apparent from, the following detailed description of various exemplary embodiments of the systems and methods according to this invention.

DETAILED DESCRIPTION OF PREFERRED EMBODIMENTS

Figure 1:
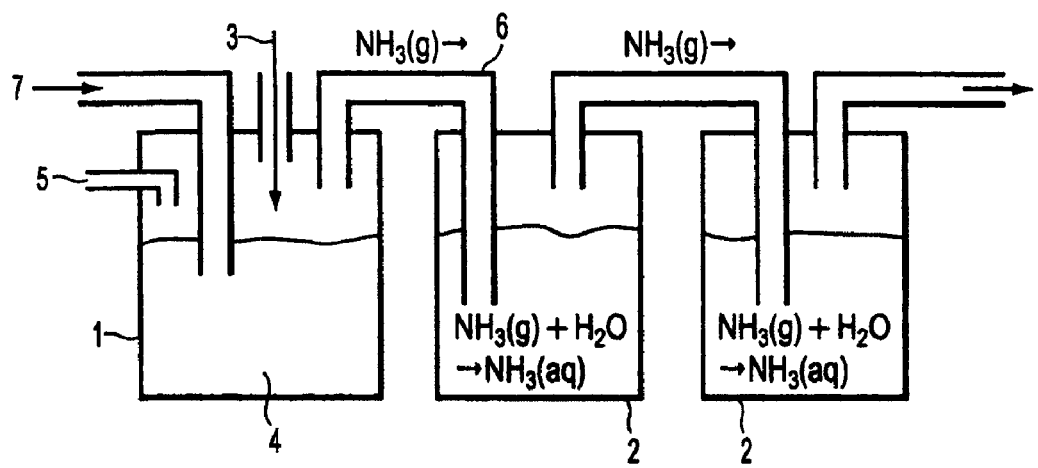
FIG. 1 is a schematic representation of a system for reclamation of ammonia from ammonia-containing chemical bath solutions within a semiconductor wafer manufacturing system.

The following detailed description of various exemplary embodiments of the process for reclaiming ammonia from waste streams in semiconductor wafer manufacturing or other technologies that produce ammonia-rich waste streams, according to this invention, may refer to one specific type of waste stream, e.g., an SC-1 chemical bath solution, for sake of clarity and familiarity. However, it should be appreciated that the principles of this invention, as outlined and/or discussed below, can be equally applied to any known or later-developed waste stream processing systems, beyond the SC-1 chemical bath solution specifically discussed herein.

At least one chemical bath solution comprising high-purity ammonium hydroxide ($NH_4OH$), water ($H_2O$), optionally hydrogen peroxide ($H_2O_2$), and, optionally, general residues from cleaning, such as an amount of dissolved and/or particulate silicon, for example, $H_2SiO_3$, is introduced into a reaction vessel. An excess of at least one hydroxide source, stored in a separate container, is introduced to the reaction vessel, and the at least one chemical bath solution and the hydroxide source are combined.

The excess of hydroxide drives, according to Le Chatelier's principle, reaction (1):

$$NH_4^+ + OH^- \leftrightarrows H_2O + NH_{3(aq)} \leftrightarrows NH_{3(g)} \tag{1}$$

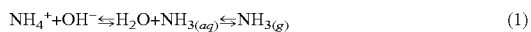

When the concentration of aqueous ammonia ($NH_{3(aq)}$) exceeds its solubility in the solution, the aqueous ammonia volatizes to a gas ($NH_{3(g)}$). The reaction vessel may be heated to a temperature in the range of 25° C. to 100° C. in order to increase the volatility of ammonia ($NH_3$) and to enhance subsequent water removal. Heating above room temperature is not, however, necessary for the reaction. The reaction vessel may be heated to a temperature in the range of from about 90° C. to about 60° C., preferably from about 80° C. to about 65° C., or more preferably approximately 70° C. If the reaction proceeds under a vacuum, the temperature of the reaction vessel may be reduced to a temperature in the range of from about 25° C. to about 70° C. preferably from about 35° C. to about 60° C. or from about 45° C. to about 55° C., or even more preferably to approximately 50° C.

Ammonia gas will evaporate and can be removed from the reaction vessel and purified by any appropriate means. Typical purification processes for ammonia gas include, but are not limited to, bubbling processes, columnar purification processes and other purification processes known in the art, for example, "aqua-ammonia" generation and purification processes. The ammonia introduced into the reaction vessel (in the form of molar equivalents of ammonium ions or ammonium compounds) by at least one waste stream, such as a SC-1 chemical bath solution, may be recovered by these means in an amount in the range of from about 50% to about 95%, preferably from about 60% to about 85%, or even more preferably from about 70% to about 80%. That is, the amount of ammonia removed from the reaction vessel (in the form of molar equivalents of ammonium ions or ammonium compounds) may correspond to more than 50% of the amount of ammonia introduced into the reaction vessel in the at least one waste stream. The removed ammonia gas can subsequently be either discarded, or more preferably, stored or recycled for further use.

If hydrogen peroxide is present in the at least one chemical bath solution, it is neutralized in the reaction vessel by reaction (2).

$$2H_2O_2 \rightarrow 2H_2O + O_{2(g)} \tag{2}$$

The water is incorporated into the reaction vessel, while the oxygen gas is discharged from the system into the atmosphere.

FIG. 1 shows a schematic illustration of an ammonia reclamation system according to the invention. Reaction vessel 1 is connected to a series of purification processing units 2 which may be comprised of deionized water bubblers, scrubbers, or combinations therein, as are well known in the art. At least one ammonia-rich waste stream 3 is introduced into the reaction vessel 1, into which a catalyst 4 may optionally have been provided. At least one hydroxide source 5 is introduced into the reaction vessel 1. The at least one ammonia-rich waste stream 3 and the at least one hydroxide source 5 react to produce gaseous ammonia, which evaporates and is removed from the reaction vessel and introduced into an "aqua-ammonias" generation or purification process via passage 6. Optionally, a purge gas 7, such as $N_{2(g)}$, may be fed into the system.

Figure 2:
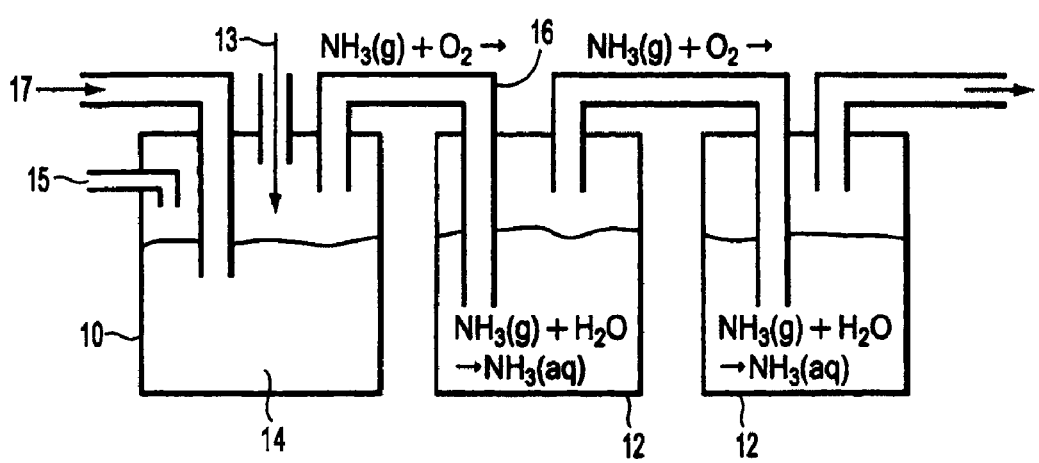
FIG. 2 is a schematic representation of a system for reclamation of ammonia from SC-1 chemical bath solutions containing hydrogen peroxide within a semiconductor wafer manufacturing system.

FIG. 2 shows a schematic illustration of an ammonia reclamation system according to the invention. Reaction vessel 10 is connected to a series of purification processing units 12 which may be comprised of deionized water bubblers, scrubbers, or combinations therein, as are well known in the art. At least one ammonia-rich waste stream 13, which includes hydrogen peroxide, is introduced into the reaction vessel 10, into which a catalyst 14 may optionally have been provided. At least one hydroxide source 15 is introduced into the reaction vessel 10. The at least one ammonia-rich waste stream 13 and the at least one hydroxide source 15 react to produce gaseous ammonia, which evaporates and is removed from the reaction vessel and introduced into an "aqua-ammonia" generation or purification process via passage 16. Optionally, a purge gas 17, such as $N_{2(g)}$, may be fed into the system.

Figure 3:
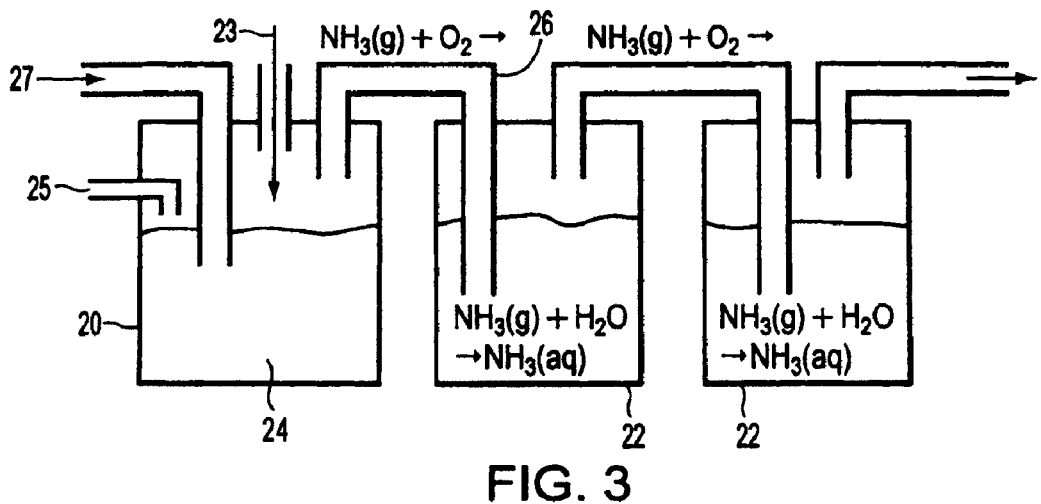
FIG. 3 is a schematic representation of a system for reclamation of ammonia from SC-1 chemical bath solutions containing hydrogen peroxide within a semiconductor wafer manufacturing system, using a hydroxide source solution.

FIG. 3 shows a schematic illustration of an ammonia reclamation system according to the invention. Reaction vessel 20 is connected to a series of purification processing units 22 which may be comprised of deionized water bubblers, scrubbers, or combinations therein, as are well known in the art. At least one ammonia-rich waste stream 23, which includes hydrogen peroxide, is introduced into the reaction vessel 20, into which a catalyst 24 may optionally have been provided. At least one hydroxide source 25 is introduced into the reaction vessel 20. The at least one ammonia-rich waste stream 23 and the at least one hydroxide source 25 react to produce gaseous ammonia, which evaporates and is removed from the reaction vessel and introduced into an "aqua-ammonia" generation or purification process via passage 26. Optionally, a purge gas 27, such as $N_{2(g)}$, may be fed into the system.

The source of hydroxide is not particularly limited. Any hydroxide compound may be used either in solution or other form. Solutions containing a high concentration of hydroxide that may be used include, but are not limited to, prepared hydroxide solutions, alkali metal hydroxide solutions and alkaline etch bath solutions, known in the semiconductor industry, as well as from other sources in the production system. Hydroxide compounds that may be used include, but are not limited to alkali metal hydroxide compounds, such as sodium hydroxide (NaOH) and potassium hydroxide (KOH).

If hydrogen peroxide ($H_2O_2$) is present, a catalyst may also be added to the reaction vessel to facilitate decomposition or neutralization of the peroxide, as set forth in reaction (2). Any suitable catalyst known or later discovered may be used, including metallic catalysts, such as, for example, copper nitrate, $Cu(NO_3)_2$, or other transition metal catalysts as are well known in the art. The catalyst may be present in an amount from 0.1 to 5% by weight of the hydroxide containing solution or more preferably in an amount of approximately 1% by weight of the hydroxide containing solution. However, no catalyst is absolutely necessary, because the heat from the external source will gradually facilitate the reaction.

The at least one chemical bath solution and hydroxide source may be added to the reaction vessel in discrete batches, by periodic addition or on a continuous basis.

Over time, a quantity of material from the residue, such as silicon, and potentially catalyst particles may accumulate in a highly concentrated hydroxide solution in the reaction vessel. This can be removed from the reaction vessel by ceasing introduction of chemical bath solution and hydroxide solution into the reaction vessel and then flushing the reaction vessel.

This invention is illustrated by the following example, which is merely for the purpose of illustration and is not to be regarded as limiting the scope of the invention, or the manner in which it may be practiced.

EXAMPLE

The following describes how the invention was used to reclaim ammonia and decompose hydrogen peroxide from an SC-1 solution in the laboratory. In this example, the test equipment is operated at atmospheric pressure; however, the efficiency of the ammonia recovery will improve if operated at decreased pressure due to the increased volatility of ammonia.

To the reaction vessel (a 1-liter polyethylene container) was added 100 grams of NaOH, 2.0 grams of $Cu(NO_3)_2 \cdot (H_2O)_n$, and 100 mL of deionized water. The DI scrubbers (1-liter polyethylene containers) were each filled with 250 mL of deionized water and surrounded by an ice bath. The reaction vessel and two scrubbers were connected in series using plastic tubing. The inlet to the scrubbers was below the level of water so as to trap the incoming ammonia gas.

Prior to the introduction of the SC-1 solution the reaction vessel was at elevated temperature (~60° C.) due to the heat evolved from the dissolution of sodium hydroxide. 100 mL of SC-1 solution containing 2.02% by weight of $NH_3$ and ~3% hydrogen peroxide was introduced into the reaction vessel under $N_2$ purge.

As the SC-1 solution entered the reaction vessel, the solution in the vessel was observed to boil vigorously as the hydrogen peroxide decomposed into water and oxygen gas. The reaction and gas purge took place for a five (5) minute duration.

The $N_2$ purge gas carried the oxygen gas and volatilized ammonia into the DI scrubbers. Gaseous ammonia reacted with water in the scrubbers to form aqueous ammonia. Oxygen gas passed through the system unreacted.

Analysis of the first DI scrubber solution showed an ammonia concentration of 0.40% by light. The ammonia concentration in the second scrubber was less than 0.05%.

The recovery was calculated by comparing the mass of ammonia recovered in the first scrubber to the mass of ammonia in the original SC-1 solution:

$$\text{Recovery}(\%) = 100 * (250 \, mL * 0.40\%)/(100 \, mL * 2.02\%) = 50\%$$

While this invention has been described in conjunction with the exemplary embodiments outlined above, various alternatives, modifications, variations, improvements, and/or substantial equivalents, whether known or that are, or may be, presently unforeseen, may become apparent to those having at least ordinary skill in the art. Accordingly, the exemplary embodiments of the invention, as set forth above, are intended to be illustrative, not limiting. Various changes may be made without departing from the spirit and scope of the invention. Therefore, the systems, methods and devices according to this invention are intended to embrace all known or later-developed alternatives, modifications, variations, improvements, and/or substantial equivalents.

What is claimed is:

1. A process for reclaiming ammonia from at least one waste stream comprising:
   providing a reaction vessel;
   introducing at least one waste stream comprising ammonium hydroxide, hydrogen peroxide, and water into the reaction vessel;
   introducing at least one hydroxide source into the reaction vessel;
   combining the at least one waste stream and the at least one hydroxide source;
   reacting the ammonium hydroxide from the at least one waste stream and the at least one hydroxide source to produce ammonia;
   and removing the ammonia from the reaction vessel.

2. The process according to claim 1, further comprising: purifying the ammonia.

3. The process according to claim 1, wherein the at least one waste stream further contains silicon in a dissolved or particulate form.

4. The process according to claim 1, wherein the step of providing a reaction vessel comprises providing a reaction vessel containing at least one catalyst.

5. The process according to claim 4, wherein the at least one catalyst is $Cu(NO_3)_2$.

6. The process according to claim 4, wherein the at least one catalyst is present in an amount from about 0.1 to about 5.0% by weight of the at least one hydroxide source.

7. The process according to claim 1, wherein the reaction vessel is maintained under vacuum.

8. The process according to claim 7, wherein the reaction vessel is maintained at a temperature in the range of from about 25° C. to about 70° C.

9. The process according to claim 7, wherein the reaction vessel is maintained at a temperature of about 50° C.

10. The process according to claim 1, wherein the reaction vessel is maintained at a temperature in the range of from about 50° C. to about 100° C.

11. The process according to claim 1, wherein the reaction vessel is maintained at a temperature of about 70° C.

12. The process according to claim 1, wherein the at least one hydroxide source is at least one solution containing hydroxide in a concentration greater than about 10% by weight and less than 55% by weight.

13. The process according to claim 12, wherein the at least one solution contains hydroxide in a concentration of about 50% by weight.

14. The process according to claim 12, wherein the source of the at least one solution is an alkaline etch bath solution.

15. The process according to claim 1, wherein the at least one hydroxide source comprises at least one alkali metal hydroxide compound.

16. The process according to claim 15, wherein the at least one alkali metal hydroxide compound is chosen from the group consisting of sodium hydroxide and potassium hydroxide.

17. The process according to claim 1, wherein the at least one waste stream comprises at least one chemical bath solution comprising ammonium hydroxide, hydrogen peroxide and water.

* * * * *